(12) United States Patent
Paré

(10) Patent No.: US 7,040,646 B2
(45) Date of Patent: May 9, 2006

(54) LOCKING ASSEMBLY FOR TRAILER HITCHES

(76) Inventor: André Paré, 985 des Orchidées, St-Charles de Drummond, Québec (CA) J2C 7T1

( * ) Notice: Subject to any disclaimer, the term of this patent is extended or adjusted under 35 U.S.C. 154(b) by 24 days.

(21) Appl. No.: 10/961,672

(22) Filed: Oct. 8, 2004

(65) Prior Publication Data

US 2006/0033309 A1    Feb. 16, 2006

(30) Foreign Application Priority Data

Aug. 10, 2004  (CA) .................................. 2477351

(51) Int. Cl.
*B60D 1/01* (2006.01)
(52) U.S. Cl. ........................... 280/507; 70/14; 70/232; 70/258
(58) Field of Classification Search .................... 70/14, 70/32–34, 58, 63, 232, 238, 258, 367, 371, 70/386, 423–428; 280/507
See application file for complete search history.

(56) References Cited

U.S. PATENT DOCUMENTS

| 3,139,291 A | 6/1964 | Geresy |
| 3,526,110 A * | 9/1970 | Foote .......................... 280/507 |
| 3,605,457 A | 9/1971 | Foster |
| 3,977,221 A * | 8/1976 | Foote .......................... 280/507 |
| 4,291,557 A * | 9/1981 | Bulle et al. .................. 280/507 |
| 4,428,596 A | 1/1984 | Bell et al. |
| 4,459,832 A | 7/1984 | Avrea et al. |
| 5,165,265 A | 11/1992 | Maionchi |
| 5,197,311 A | 3/1993 | Clark |
| 5,255,545 A | 10/1993 | Wheeler |
| 5,259,223 A | 11/1993 | Nee |
| 5,520,030 A | 5/1996 | Muldoon |
| 5,752,398 A * | 5/1998 | Villalon, Jr. ................ 280/507 |
| 5,782,115 A | 7/1998 | Judy |
| 5,937,679 A * | 8/1999 | Villalon, Jr. ................ 280/507 |
| 6,062,583 A | 5/2000 | Lauricella, Jr. |
| 6,193,261 B1 * | 2/2001 | Hahka ........................ 280/507 |
| 6,244,614 B1 | 6/2001 | Bonvillair et al. |
| 6,364,339 B1 * | 4/2002 | Lee ............................ 280/507 |
| 6,402,181 B1 * | 6/2002 | Lee ............................ 280/507 |
| 6,412,314 B1 | 7/2002 | Jenks |
| 6,412,315 B1 * | 7/2002 | Cheng et al. ............... 280/507 |
| 6,434,982 B1 | 8/2002 | Rowland |
| 6,543,260 B1 * | 4/2003 | Koy et al. ................... 280/507 |
| 2003/0034633 A1 * | 2/2003 | Belinky ...................... 280/507 |

* cited by examiner

*Primary Examiner*—Lesley D Morris
*Assistant Examiner*—Matthew Luby
(74) *Attorney, Agent, or Firm*—Eric Fincham

(57) ABSTRACT

A locking assembly which comprises at least a first housing member which is designed to be secured to a second member, the housing member having a channel extending therethrough and an elongated inner component with an axially extending cavity therein, an actuator which is axially movable within the cavity and moves the locking protrusion into locking engagement with a recess associated with the second member, and a stop to limit the axial movement of the actuator. A lock is mounted internally of the actuator and engages the actuator and the inner component when in a locked position to prevent axial movement of the actuator while engaging only the actuator when in the opened position to permit axial movement. The locking assembly is particular suitable for use with various types of trailer hitches.

18 Claims, 9 Drawing Sheets

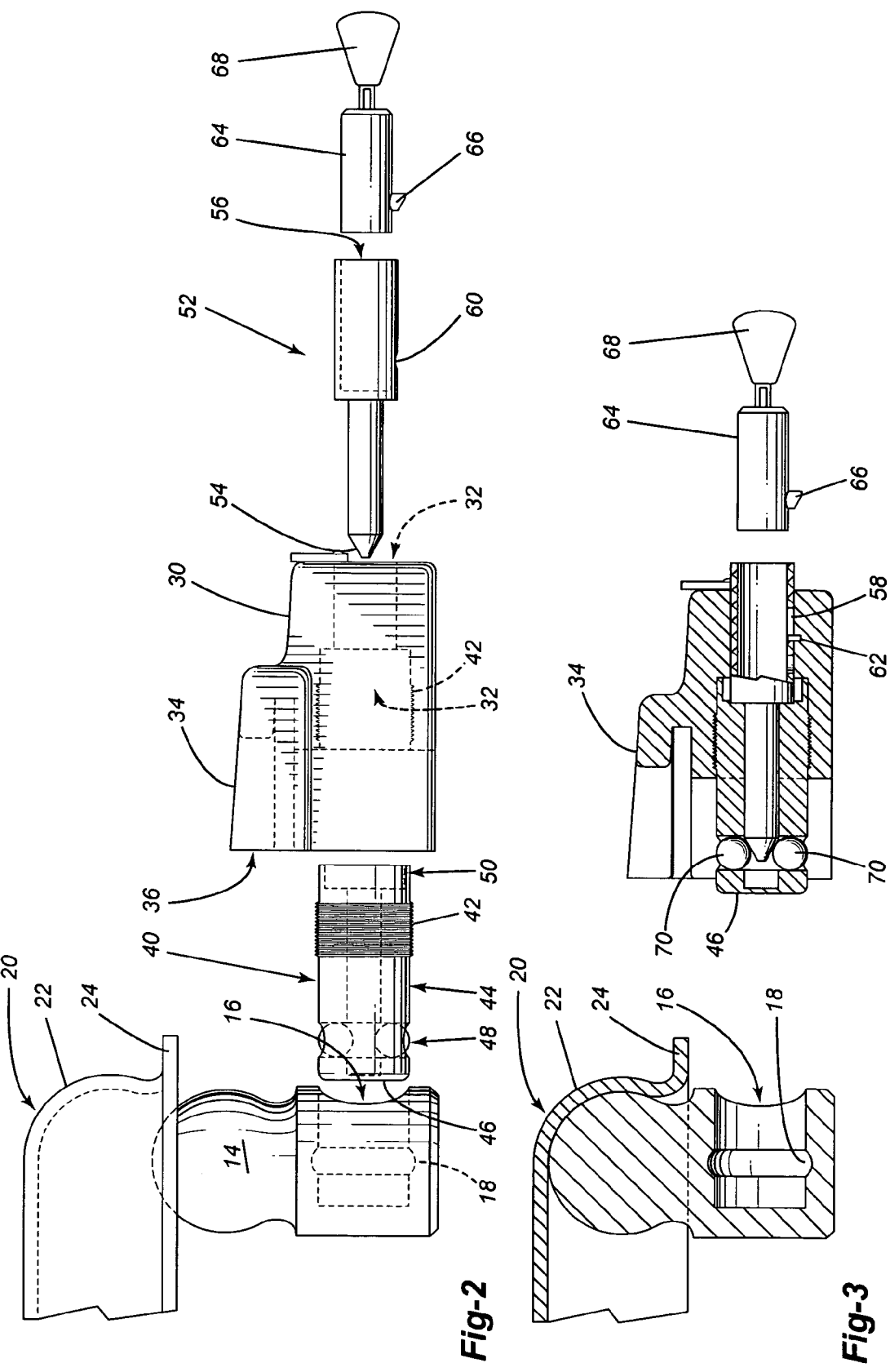

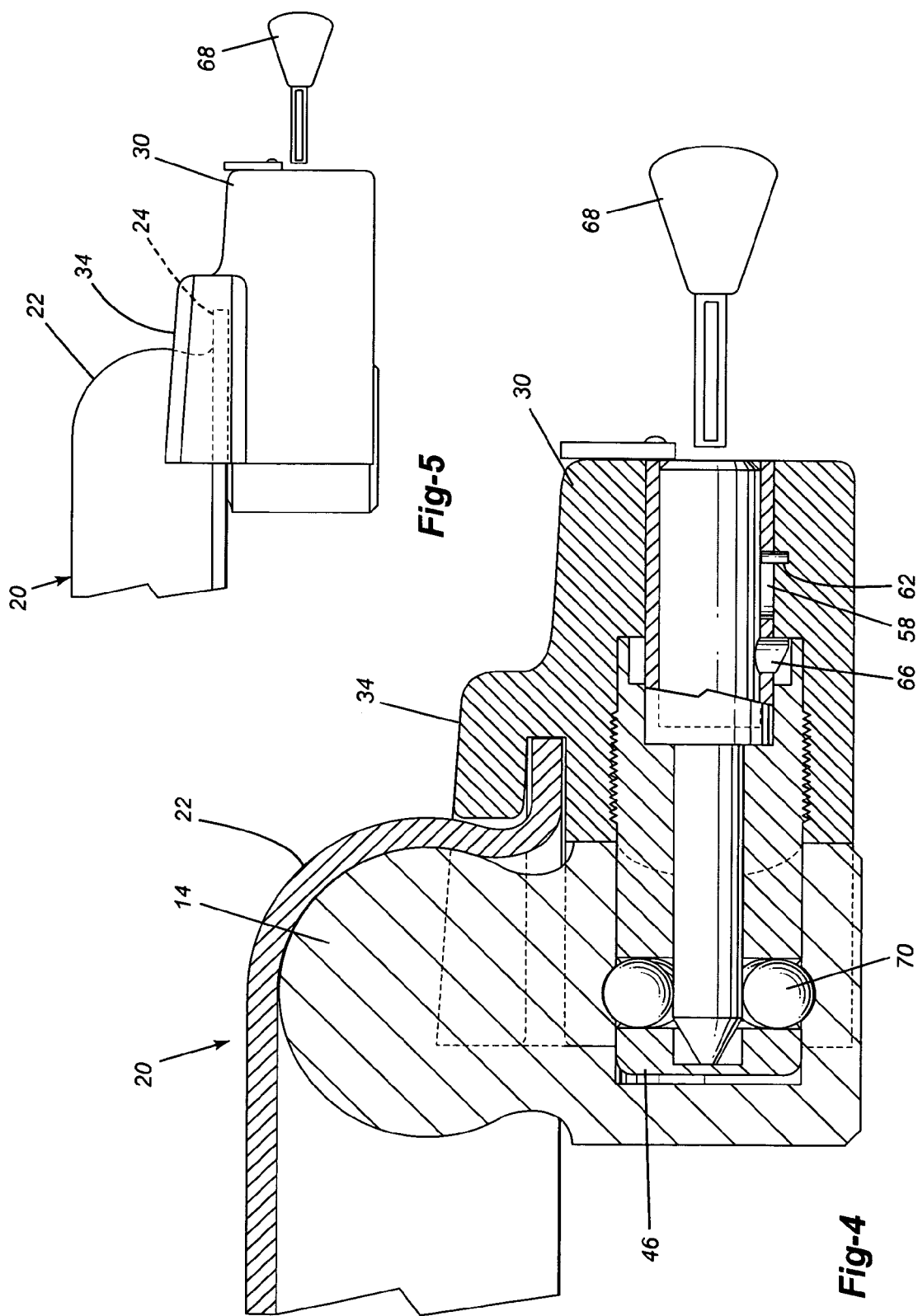

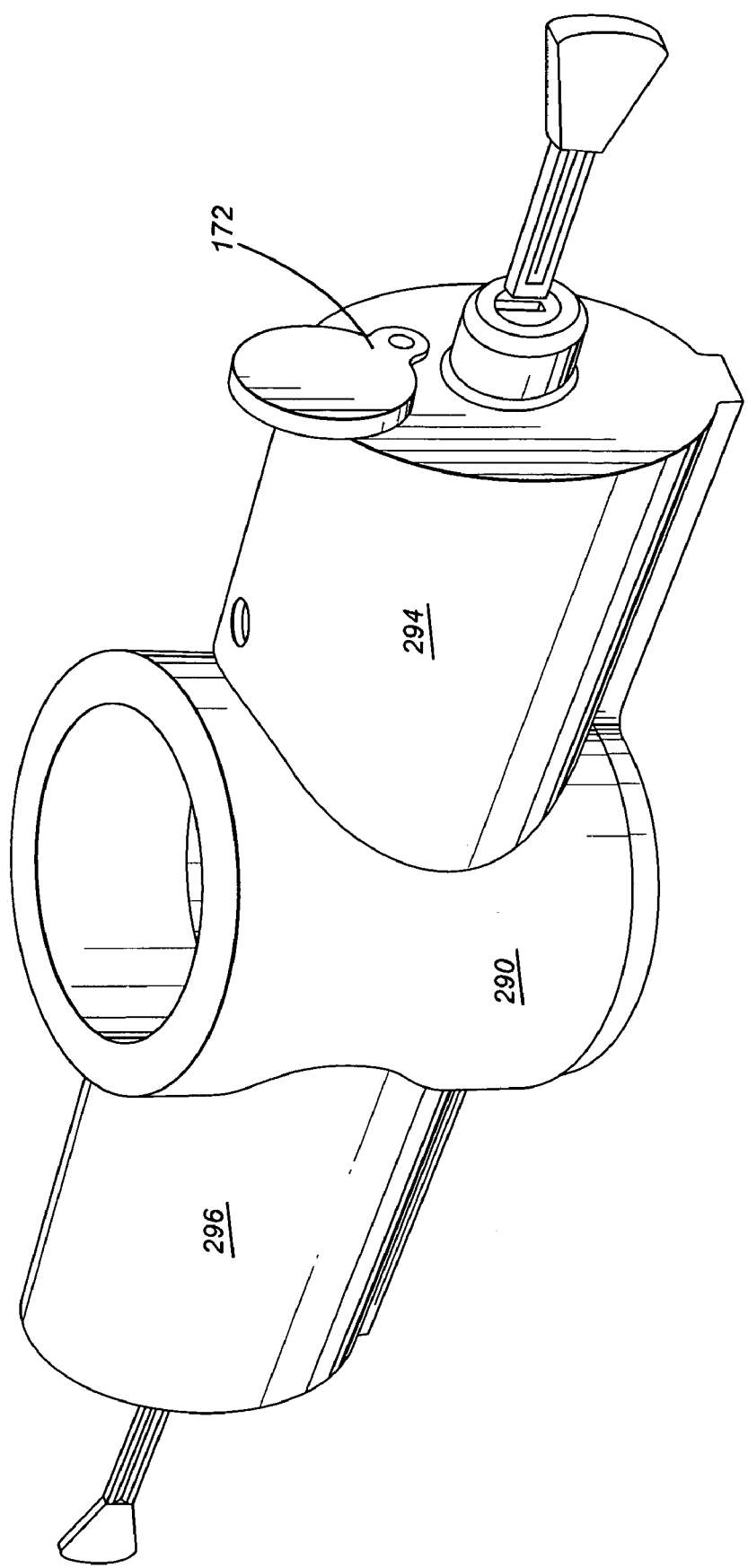

LOCKING ASSEMBLY FOR TRAILER HITCHES

FIELD OF THE INVENTION

The present invention relates to locks and more particularly, relates to commercial type locks and locks which may be utilized to secure trailer hitches and the like.

BACKGROUND OF THE INVENTION

It is well known in the art that trailers generally utilize ball type hitches which include a socket for receiving a ball. As a result, there are generally accepted standards in the industry and there are many vehicles which are equipped with a trailer hitch ball which is capable of being secured to an unattended trailer. Such trailer thefts are relatively common.

In order to prevent this theft, and particularly when the trailer is not secured to the proper vehicle, devices such as padlocks and chains have been utilized for attaching the trailer to an adjacent fixed object such as a post or the like. However, such locking can easily be defeated by use of bolt cutters and the like.

A similar problem arises even when the trailer is attached to its own vehicle. In order to prevent theft when unattended, cables and padlocks are typically used for providing a locking arrangement. Again, chain cutters can be utilized and/or the lock can easily be forced or picked.

It is known in the art that such a problem exists and there have been various proposals for trailer hitch locks which can be secured to the trailer hitch coupler to prevent theft. Such devices must, at the same time, be easily secured and removable to allow the owner to quickly attach and remove the lock.

SUMMARY OF THE INVENTION

It is accordingly an object of the present invention to provide a locking device suitable for securing a trailer and which device is difficult to defeat while at the same time providing ease of use.

It is a further object of the present invention to provide a lock which may be utilized in many different arrangements and which lock is suitable for different purposes.

The present invention provides a locking assembly which comprises a first housing member designed to be secured to a second member having a recess therein, a channel extending through the housing member, an elongated inner component mounted in the channel, the inner component having an axially extending cavity therein, an actuator axially movable within the cavity, the actuator being operative to move a locking protrusion into locking engagement with the recess of the second member, and a limiting means designed to limit axial movement of the actuator within the cavity between a locked position and an unlocked position, a lock mounted interiorly of the actuator the lock being operative to move between a locked position and an opened position, the lock engaging the actuator and the inner component when in the locked position to thereby prevent axial movement of the actuator, the lock engaging only the actuator when in the opened position to thereby permit axial movement of the actuator to the unlocked position.

In a further aspect of the present invention, there is provided a locking assembly comprising a housing member having a recess formed therein, a channel extending through the housing, the channel being in communication with the recess, an elongated inner component mounted in the channel, the inner component having an axially extending cavity therein, an actuator axially movable within the cavity, the actuator being operative to move a locking protrusion into the recess, a limiting means designed to limit axial movement of the actuator within the cavity between a locked position and an unlocked position, a lock mounted internally of the actuator, the lock being operative to move between a locked position and an opened position, the locking engaging the actuator and the inner component when in the locked position to thereby prevent axial movement of the actuator, the lock engaging only the actuator when in the opened position to thereby permit axial movement of the actuator to the unlocked position.

The locking assembly of the present invention may be utilized with commercially available locks such as those marketed under the trademark ABLOY and which are known for being of high security.

As set forth above, the locking assembly may take a form where a single housing member is utilized in conjunction with a trailer tongue or another embodiment, there may be provided first and second housing members which are secured together about the hitch. Different models will provide security for different configurations of hitches.

As set forth above, the locking protrusion preferably comprises at least one spherical member and in a preferred embodiment will provide a pair of such spherical members.

For extra security, the housing may include various inserts of hardened material such as a carbide portion. The locks may be formed of any suitable material depending upon the final use. Thus, they may be made of a stainless steel or alternatively, of a cast iron material. In some instances, the use of aluminum blocks coated with a rigid protective film by anodization may be suitable.

BRIEF DESCRIPTION OF THE DRAWINGS

Having thus generally described the invention, reference will be made to the accompanying drawings illustrating an embodiment thereof, in which:

FIG. 2 is a side exploded view of the arrangement of FIG. 1;

FIG. 3 is a side sectional view thereof;

FIG. 4 is a cross sectional view showing the locking assembly in a lock position about a trailer hitch;

FIG. 5 is a side elevational view of the arrangement of FIG. 4;

FIG. 10 is a perspective view of a still further embodiment of a locking assembly.

DESCRIPTION OF THE PREFERRED EMBODIMENTS

Figure 1:
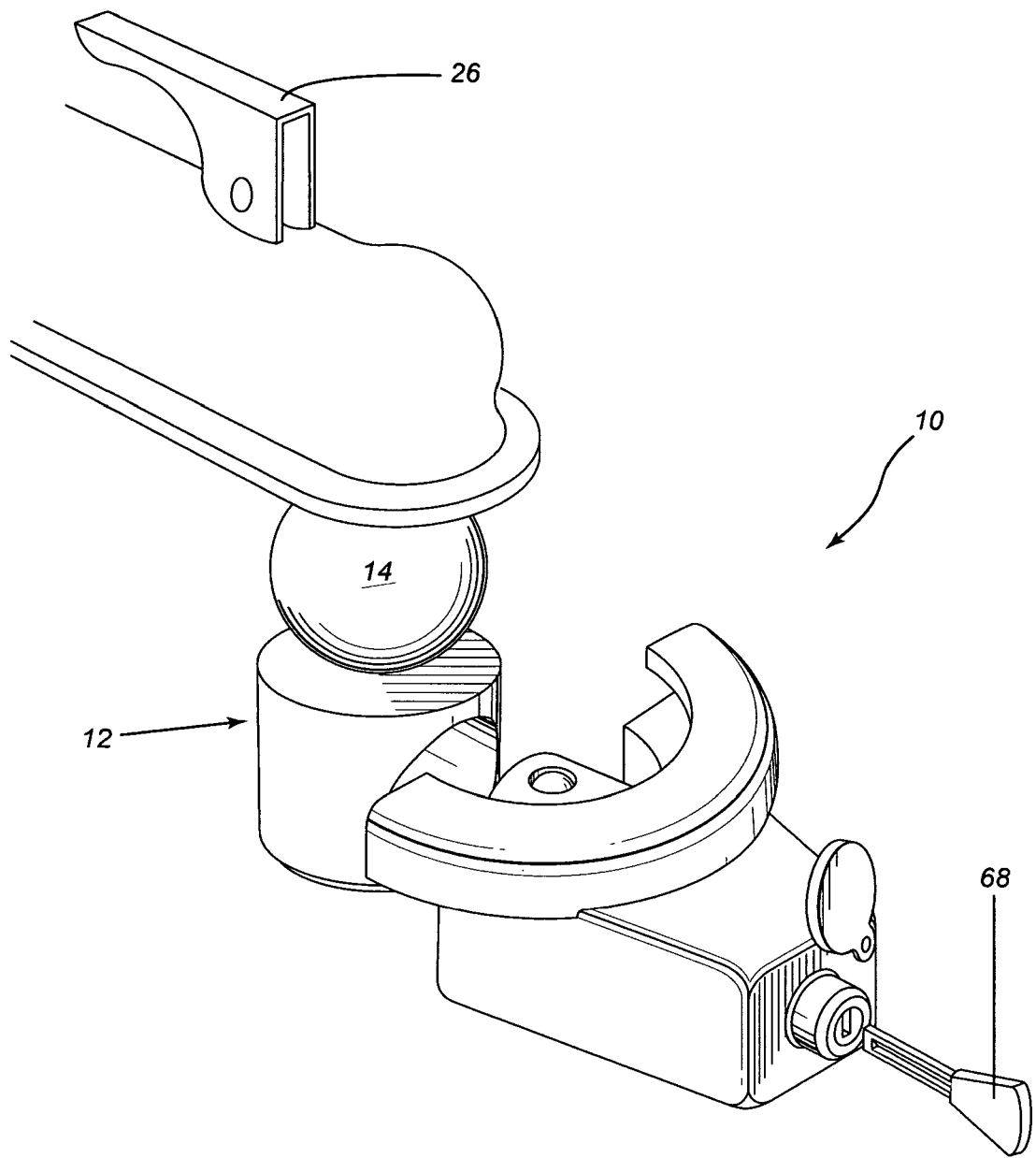
FIG. 1 is a perspective exploded view of a ball hitch utilizing a locking assembly according to the present invention.

Referring to the drawings in greater detail and by reference characters thereto, there is illustrated a locking assembly which is generally designated by reference numeral 10. Locking assembly 10 is designed to be utilized in conjunction with a ball hitch 12 having a ball 14 on the upper end thereof. Ball 14 has a recess 16 formed therein with a circular groove 18 formed within the interior walls extending about recess 16.

As is conventional, a trailer tongue 20 has a semi spherical portion 22 which is designed to sit on ball 14. A flange 24 extends about the end of tongue 20. A locking handle 26 is provided, in a known manner, to lock trailer tongue 20 onto ball 14.

Locking assembly 10 includes a housing 30 which has a channel 32 extending therethrough. Housing 30 also includes a top flange portion 34 which partially defines an upper recess 36 sized and arranged such that it will fit about flange 24 of trailer tongue 20. In the wall defining channel 32, there are provided screw threads 38.

An elongated inner component generally designated by reference numeral 40 is designed to fit within channel 32. Elongated inner component 40 includes a central threaded portion 42 which is designed to screw threadedly engage threads 38. At a first end 44, there is provided an end wall 46 while a pair of apertures 48 are provided in the side wall proximate end wall 46. At a second end 50 there is provided a non screw-threaded portion.

Locking assembly 10 also includes an actuator generally designated by reference numeral 52. Actuator 52 has, at one end thereof, a conical portion 54. Actuator 52 also has an inner cavity 56 for reasons which will become apparent therein below. Within the side wall of actuator 52, there is provided a longitudinally extending groove 58. There is also provided an aperture 60. In this respect, there is also provided an inwardly extending pin from the interior wall of elongated inner component 40.

A lock 64 of a known type is utilized and which has an outwardly extending engaging member 66 which is extended outwardly by use of a key 68. In this regard, engaging member 66 extends outwardly for its full distance when in locked position while, when in unlocked position, extends only slightly outwardly.

A pair of spherical members 70 are located within elongated inner component 40 and are arranged to seat such that they partially extend through aperture 48.

In use, elongated inner component 40 is placed within channel 32 of housing 30 and secured therein by means of screw threads 42 on elongated inner component 40 and threads 38 within channel 32. Subsequently, actuator 52 is inserted within elongated inner component 40. Conical portion 54 is operative to move spherical members 70 outwardly through apertures 48.

Lock 64 is designed to fit within actuator 52 and in this respect, outwardly extending engaging member 66 extends through aperture 60. In its fully extended locked position, engaging member 66 will pass through both actuator 52 and into elongated inner component 40. In its retracted position, engaging member 66 will only engage actuator 52 such that actuator 52 may move axially within elongated inner component 40. The range of movement is restricted by the engagement of pin 62 within groove 58. Thus, when in unlock position, key 68 may be used to pull lock 64 outwardly and cause disengagement of actuator 52 with spherical members 70 to permit unlocking thereof. A cover member 72 is provided to cover the key hole when not in use.

Figure 6:
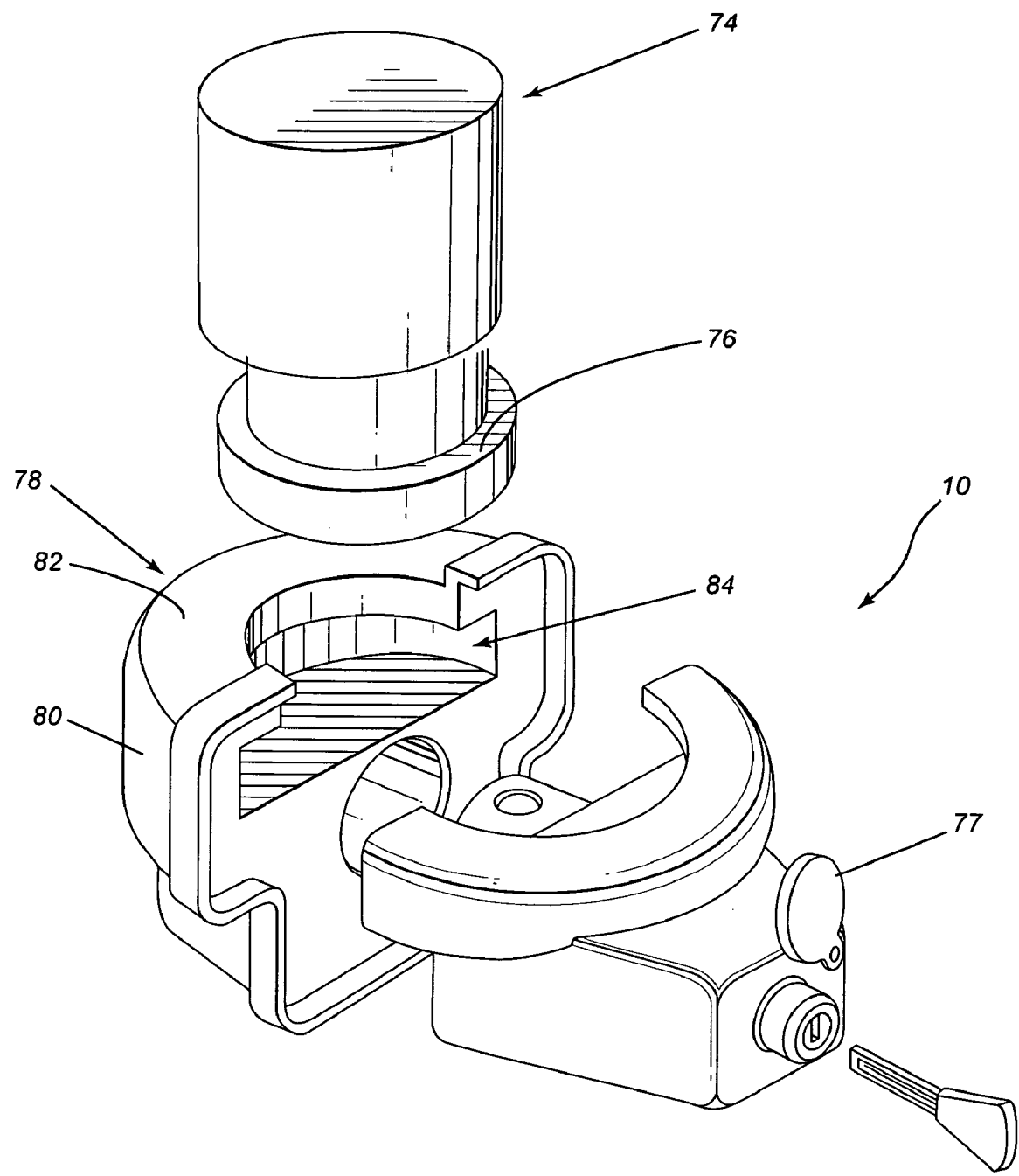
FIG. 6 is a perspective exploded view of a second embodiment of a locking assembly as use with a fifth-wheel.
Figure 7:
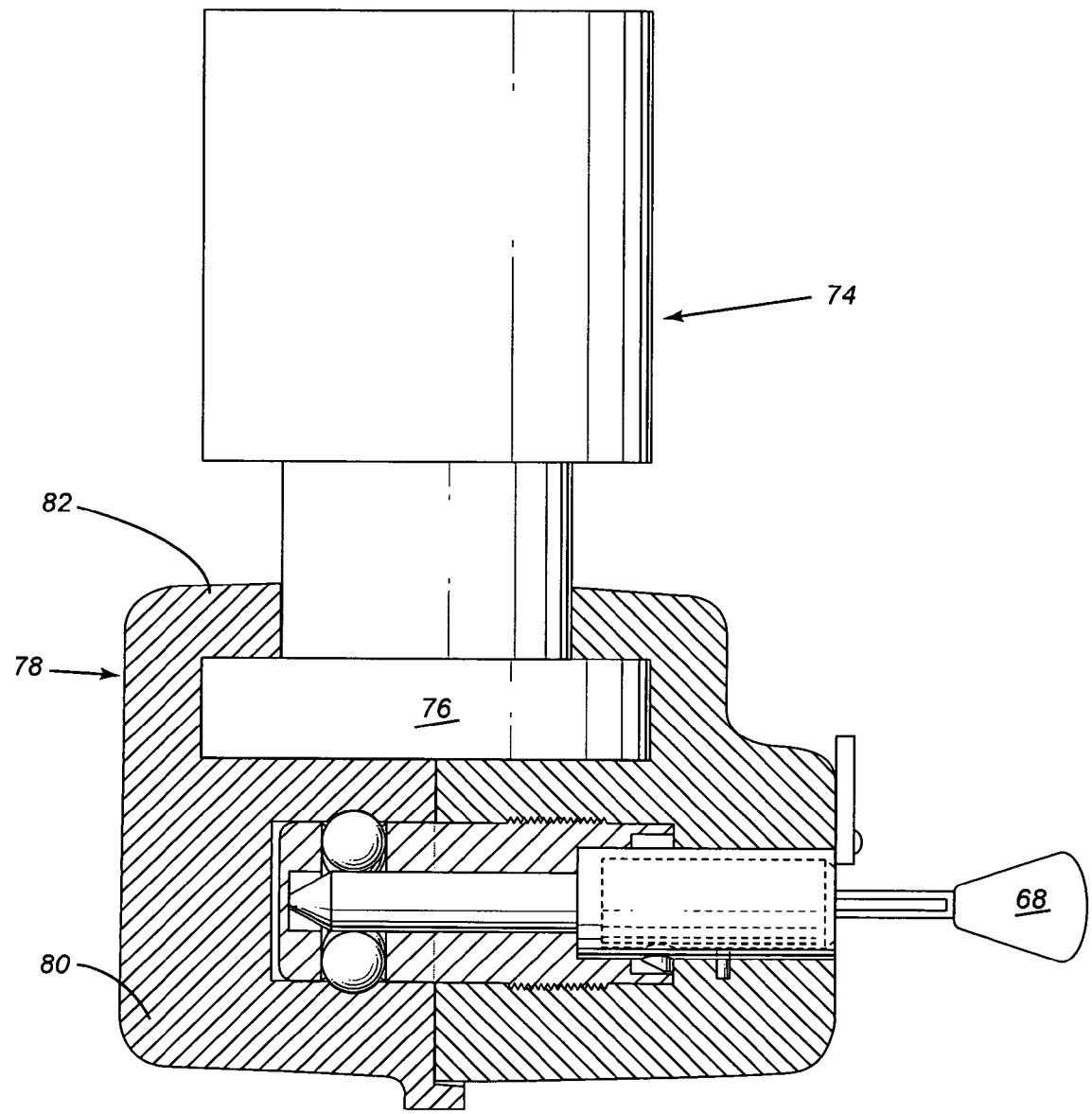
FIG. 7 is a cross sectional view of the locking assembly of FIG. 6 in a locked position.

Turning to the embodiment of FIGS. 6 and 7, there is illustrated a locking assembly for use with a hitch 74 as commonly used on a fifth-wheel.

Hitch 74 includes a bottom ring 76. In this embodiment, there is provided a second lock member 78 which is comprised of a housing 80 and a flange 82 which define an upper recess 84. Upper recess 84 is designed, with upper recess 36, to fit about ring 76 as may be seen in FIGS. 6 and 7.

In this arrangement, second locking member 78 includes a lower recess 86 having a groove 88 formed therein. In this arrangement, actuator 52 is operative to force spherical members 70 into engagement with groove 88. A part from the above, the locking assembly operates in exactly the same fashion as previously described.

Figure 8:
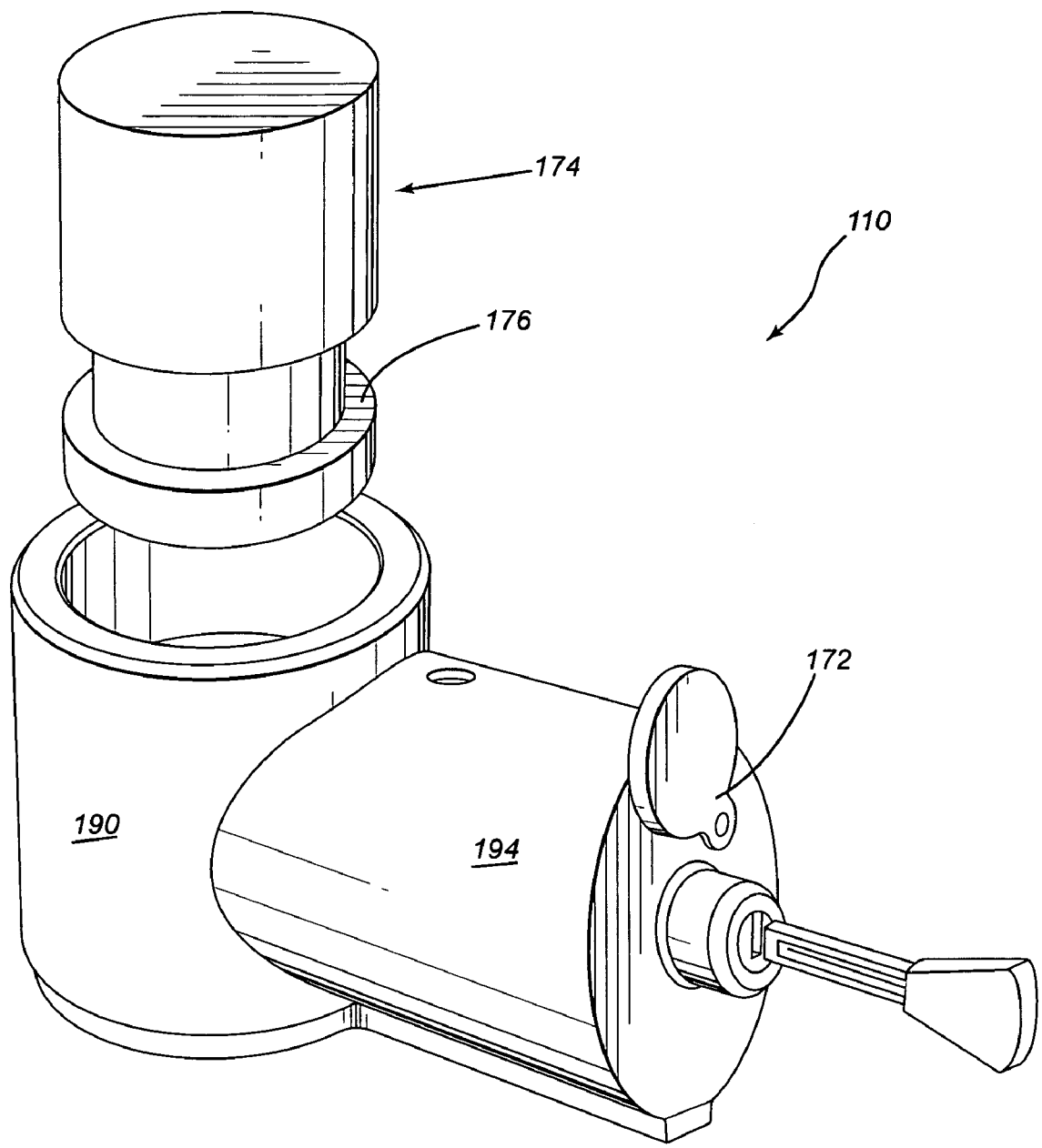
FIG. 8 is a perspective view of a further embodiment of a locking assembly according to the present invention.

A further embodiment of the present invention is illustrated in FIGS. 8 and 9 and which embodiment will now be briefly described. In this embodiment, the locking assembly is designated generally by reference numeral 110 and like reference numerals in the one hundred are utilized for like components.

Figure 9A:
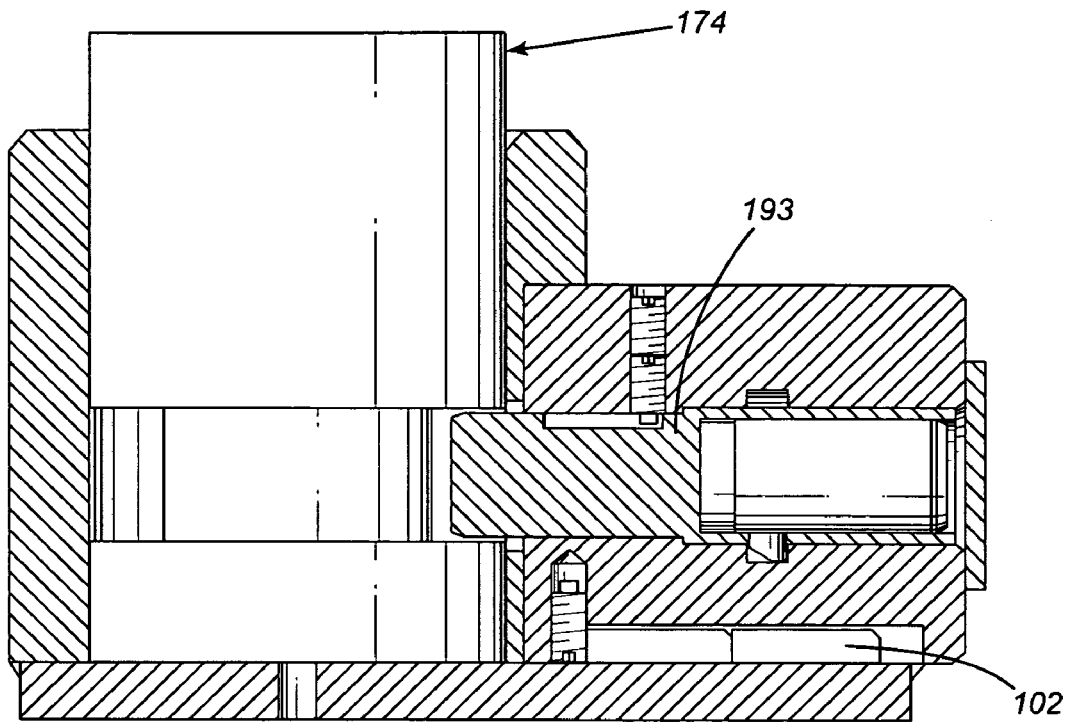
FIG. 9a is a cross sectional view of the locking assembly of FIG. 8 in a locked position.
Figure 9B:
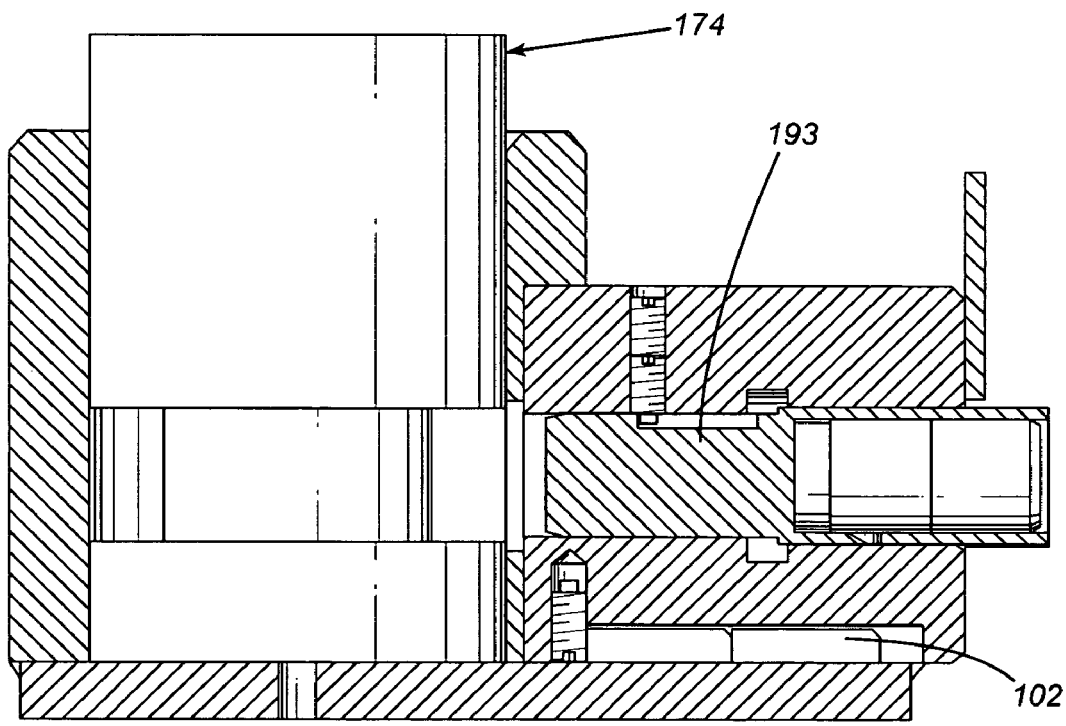
FIG. 9b is a cross sectional view of the locking assembly of FIG. 8 in an unlocked or opened position.

The locking assembly 110 includes a main body portion 190 which is cylindrical in configuration and having a recess to receive a hitch 174 as commonly used on a fifth-wheel. A side body portion 194 is also generally cylindrical in configuration and is formed integrally with main body portion 190. Within side body portion 194, there is mounted a locking mechanism substantially as previously described except for the use of spherical members. Instead, an extended plunger 193 is utilized. As shown in FIGS. 9a and 9b, carbide members 102 may be inserted in the body. The addition of such carbide members will add protection against the use of cutting tools to try to defeat the lock. As may be seen, the use of the locking assembly makes the trailer hitch unaccessible and prevents the theft thereof. As will be readily understood, the carbide members 102 may be utilized in any of the locking assemblies of the present invention. In FIG. 9A, only one carbide member is shown, while in FIG. 9B, additional exterior carbide members are provided.

FIG. 10 illustrates an embodiment similar to that described with respect to FIGS. 8 and 9 except that two sides body portions 294, 296 extend from main body portion 290. Thus, two locking mechanisms may be provided to double the amount of time which could be required to defeat the lock.

Figure 11:
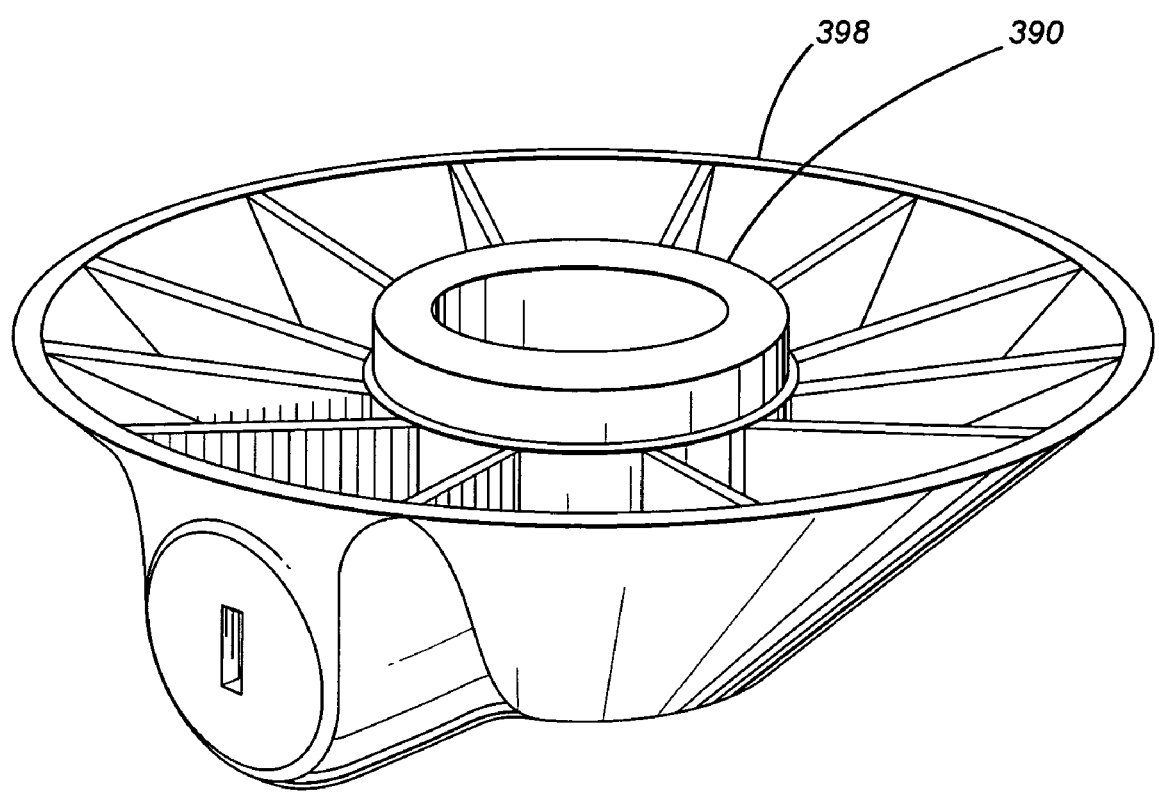
FIG. 11 is a perspective view of a further embodiment of a locking assembly according to the present invention.

In the embodiment of FIG. 11, a main body portion 390 is provided with a shell 398 thereabout. This embodiment could also utilize a double lock mechanism similar to that described with respect to FIG. 10. The shell 398 is preferably of a polyurethane and is impact resistant. In the case of the double lock mechanism, the arrangement would provide protection for twice as long compared to the protection from a single lock mechanism. This arrangement also prevents or deters attempting the use of a chain or a modified hitching to remove the same.

It will be understood that the above described embodiments are for purposes of illustration only and the changes and modifications may be made thereto without departing from the spirit and scope of the invention.

I claim:

1. A locking assembly comprising:
   a first housing member designed to be secured to a second member having a recess therein;
   a channel extending through said housing member;

an elongated inner component mounted in said channel, said inner component having an axially extending cavity therein;

an actuator axially movable within said cavity, said actuator being operative to move a locking protrusion into locking engagement with said recess of said second member;

a limiting means designed to limit axial movement of said actuator within said cavity between a locked position and an unlocked position;

a lock mounted internally of said actuator, said lock being operative to move between a locked position and an opened position, said lock engaging said actuator and said inner component when in said locked position to thereby prevent axial movement of said actuator, said lock engaging only said actuator when in said opened position to thereby permit axial movement of said actuator to said unlocked position.

2. The locking assembly of claim 1 wherein said second member comprises a second housing member.

3. The locking assembly of claim 2 wherein said recess of said second member has a groove formed in a recess wall thereof.

4. The locking assembly of claim 2 wherein said elongated inner component is cylindrical and screw threadedly engaged with said housing member.

5. The locking assembly of claim 1 wherein said locking protrusion comprises at least one spherical member partially extending through an aperture in said elongated inner component, said spherical member being movable into and out of a locking position by means of said actuator, said actuator having a leading conical portion.

6. The locking assembly of claim 5 wherein said locking protrusion comprises two spherical members movable into and out of a locking position through respective apertures in said elongated inner component.

7. The locking assembly of claim 1 wherein said limiting means for limiting axial movement of said actuator comprises a pin extending interiorly of said channel in said inner component, and a groove formed in said actuator whereby said pin is guided within said groove.

8. The locking assembly of claim 1 wherein said lock comprises a cylindrical lock having an engaging member extending from a side wall thereof.

9. The locking assembly of claim 1 wherein said inner component comprises a first portion having apertures therein to receive a spherical member forming said locking protrusion, a second portion having screw threads on an outer surface thereof, and a third section designed to cover said engaging member.

10. The locking assembly of claim 1 wherein said housing has an upper recess to fit about a flange of a trailer tongue.

11. The locking assembly of claim 1 wherein said second member comprises a ball hitch having said recess formed therein.

12. The locking assembly of claim 5 further including a pivoting barrier on said housing to protect said lock.

13. The locking assembly of claim 1 wherein said locking protrusion comprises an end portion of said actuator such that when said actuator is moved axially into a locked position, said end portion enters said recess of said second member.

14. The locking assembly of claim 2 wherein both of said first and second members have a recess formed in an upper portion thereof.

15. A locking assembly comprising:

a housing member having a recess formed therein;

a channel extending through said housing, said channel being in communication with said recess;

an elongated inner component mounted in said channel, said inner component having an axially extending cavity therein;

an actuator axially movable within said cavity, said actuator being operative to move a locking protrusion into said recess;

a limiting means designed to limit axial movement of said actuator within said cavity between a locked position and an unlocked position;

a lock mounted internally of said actuator, said lock being operative to move between a locked position and an opened position, said locking engaging said actuator and said inner component when in said locked position to thereby prevent axial movement of said actuator, said lock engaging only said actuator when in said opened position to thereby permit axial movement of said actuator to said unlocked position.

16. The locking assembly of claim 15 further including a second channel extending through said housing member, a second elongated inner component mounting in said second channel, said second inner component having a second axially extending cavity therein, a second actuator axially movable within said second cavity, said second actuator being operative to move a second locking protrusion into said recess, a second limiting means designed to limit axial movement of said second actuator within said second cavity between a locked position and an unlocked position, a second lock mounted internally of said second actuator, said second lock being operative to move between a locked position and an opened position, said second lock engaging said second actuator and said second inner component when in said locked position to thereby prevent axial movement of said second actuator, said second lock engaging only said second actuator when in said opened position to thereby permit axial movement of said second actuator to said unlocked position.

17. The locking assembly of claim 1 further including at least one carbide insert in said housing.

18. The locking assembly of claim 15 wherein said housing further includes a moulded plastic shell thereabout.

* * * * *